(12) United States Patent
Munzinger

(10) Patent No.: US 11,628,843 B2
(45) Date of Patent: Apr. 18, 2023

(54) METHOD AND DRIVER ASSISTANCE SYSTEM FOR CONTROLLING A MOTOR VEHICLE AND MOTOR VEHICLE

(71) Applicant: Bayerische Motoren Werke Aktiengesellschaft, Munich (DE)

(72) Inventor: Nathan Munzinger, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 678 days.

(21) Appl. No.: 16/208,706

(22) Filed: Dec. 4, 2018

(65) Prior Publication Data

US 2019/0168766 A1 Jun. 6, 2019

(30) Foreign Application Priority Data

Dec. 5, 2017 (DE) ...................... 10 2017 221 940.8

(51) Int. Cl.
| | | |
|---|---|---|
| *B60W 40/06* | (2012.01) | |
| *G06V 20/56* | (2022.01) | |
| *G05D 1/02* | (2020.01) | |

(52) U.S. Cl.
CPC ............ *B60W 40/06* (2013.01); *G05D 1/024* (2013.01); *G05D 1/0246* (2013.01); *G05D 1/0255* (2013.01); *G06V 20/588* (2022.01); *B60W 2420/42* (2013.01); *B60W 2420/52* (2013.01); *B60W 2420/54* (2013.01); *G05D 2201/0213* (2013.01); *G06V 20/56* (2022.01)

(58) Field of Classification Search
CPC ......... B60W 2420/42; B60W 2420/52; B60W 2420/54; B60W 40/06; B60W 2050/0088; B60W 2552/00; G05D 1/024; G05D 1/0246; G05D 1/0255; G05D 2201/0213; G06K 9/00798; G06K 9/00791
USPC .......................................... 382/104
See application file for complete search history.

(56) References Cited

U.S. PATENT DOCUMENTS

| | | | | |
|---|---|---|---|---|
| 5,107,946 A | * | 4/1992 | Kamimura | G05D 1/0246 |
| | | | | 318/587 |
| 9,770,959 B2 | * | 9/2017 | Unger | B60G 17/0165 |
| 10,724,865 B1 | * | 7/2020 | Ferguson | G01S 17/86 |

(Continued)

FOREIGN PATENT DOCUMENTS

| | | | |
|---|---|---|---|
| DE | 10 2012 219 631 A1 | 4/2014 | |
| DE | 10 2015 121 537 A1 | 6/2017 | |

(Continued)

OTHER PUBLICATIONS

German Search Report issued in counterpart German Application 10 2017 221 940.8 dated Nov. 8, 2018 with partial English translation (thirteen pages).

*Primary Examiner* — Charles T Shedrick
(74) *Attorney, Agent, or Firm* — Crowell & Moring LLP

(57) ABSTRACT

A method controls a first motor vehicle. The method includes the steps of: i) receiving status data of a roadway section and a geographic position of the roadway section by the first motor vehicle, ii) sensing, as a function of the received status data, the roadway section by a surroundings sensor of the first motor vehicle, and in response thereto, iii) aligning the surroundings sensor with a particular roadway feature of the roadway section, and/or iv) adapting an evaluation of data of the surroundings sensor, and/or v) updating the status data and transmitting the updated status data.

17 Claims, 2 Drawing Sheets

(56) References Cited

U.S. PATENT DOCUMENTS

| | | | |
|---|---|---|---|
| 11,490,056 B2* | 11/2022 | Sato | G05D 1/0088 |
| 2005/0187678 A1* | 8/2005 | Myeong | G05D 1/0255 |
| | | | 701/25 |
| 2014/0122014 A1 | 5/2014 | Flik et al. | |
| 2015/0092058 A1* | 4/2015 | Bone | H04N 17/002 |
| | | | 348/148 |
| 2017/0096042 A1 | 4/2017 | Unger et al. | |
| 2017/0174227 A1* | 6/2017 | Tatourian | G06V 10/255 |
| 2018/0024246 A1* | 1/2018 | Jeong | G01S 7/4818 |
| | | | 359/204.1 |
| 2019/0009629 A1* | 1/2019 | Beylin | B60G 3/145 |
| 2019/0030977 A1* | 1/2019 | Beylin | B60G 21/026 |
| 2019/0179026 A1* | 6/2019 | Englard | G01S 17/86 |
| 2019/0329763 A1* | 10/2019 | Sierra Gonzalez | |
| | | | B60W 50/0097 |

FOREIGN PATENT DOCUMENTS

| | | |
|---|---|---|
| DE | 10 2016 103 251 A1 | 8/2017 |
| DE | 10 2014 008 425 B4 | 9/2017 |
| DE | 10 2016 216 152 A1 | 3/2018 |

\* cited by examiner

METHOD AND DRIVER ASSISTANCE SYSTEM FOR CONTROLLING A MOTOR VEHICLE AND MOTOR VEHICLE

CROSS REFERENCE TO RELATED APPLICATION

This application claims priority under 35 U.S.C. § 119 from German Patent Application No. 10 2017 221 940.8, filed Dec. 5, 2017, the entire disclosure of which is herein expressly incorporated by reference.

BACKGROUND AND SUMMARY OF THE INVENTION

The present invention relates to a method and to a driver assistance system for controlling a first motor vehicle with the aim of achieving improved driving comfort. Moreover, the present invention also relates to a motor vehicle with increased driving comfort.

Modern motor vehicles are nowadays able to adapt vehicle movement dynamics properties, including, in particular, the vertical dynamics of the motor vehicle, as a function of a roadway status. The driving comfort of the motor vehicle can be improved by adaptation to high-frequency excitations, specifically wheel-frequency excitations. A disadvantage of this is that it is difficult to adapt vehicle movement dynamics properties, in particular on the basis of high-frequency excitations, since the time for sensing and processing the sensed roadway status is only very short. Predicting roadway unevennesses requires, in particular for high-frequency unevennesses, a very high resolution and very precise positioning with respect to the wheel contact points and does not provide sufficient remedy owing to these requirements.

In order to improve the driving comfort, e.g., DE 10 2015 121 537 A1 proposes a method for adjusting chassis parameters of a vehicle on the basis of a classification of a route section which is traveled on by the vehicle. Moreover, DE 10 2012 219 631 A1 describes a method for detecting roadway unevennesses, wherein a geographic position is assigned to the roadway unevennesses.

Taking this prior art as a basis, an object of the present invention is to provide a method and a driver assistance system for controlling a first motor vehicle which increase the driving comfort for a vehicle occupant of the first motor vehicle or also, under certain circumstances, for an occupant of a further motor vehicle. In addition, an object of the present invention is to provide a motor vehicle having a high level of driving comfort.

The object is achieved by a method for controlling a first motor vehicle. For this purpose, the first motor vehicle receives, in a first method step, status data of a roadway section and a geographic position of the roadway section, the last-mentioned data being, for example, in the form of GPS data. The status data in this context can all relate to data of the roadway section which can be determined by sensors, that is to say both the roadway contour or condition of the roadway and any obstacles on the roadway section. The status data therefore also relate to the direct surroundings of the roadway section and consequently to all the aspects which are relevant for traveling on the roadway section. By virtue of the reception of the geographic position of the roadway section, the roadway section can be assigned, for example, to a route of the first motor vehicle. However, it is more importantly, the location of particular roadway features which can be identified from the status data of the roadway section, which can be obtained. The term particular roadway feature comprises here all features which deviate from a normal condition of the roadway and which are distinguished, in particular, by evenness and the absence of obstacles, such as e.g. a pothole, a gulley cover, a barrier and the like.

In a further method step, the roadway section is sensed by a surroundings sensor of the first motor vehicle as a function of the received status data. This can be done e.g. before or when the first motor vehicle passes through the roadway section, and is carried out, in particular, before the roadway section is passed through. In this context, it goes without saying that the roadway section can also be sensed by two or more surroundings sensors of the first motor vehicle. The type and number of the surroundings sensors which are used for this is dependent on the conditions of the surroundings of the roadway section and of any particular roadway features which are to be determined.

In response to the sensing of the roadway section by the surroundings sensor, different steps which are all aimed at improving the driving comfort of the first motor vehicle can be carried out independently of one another.

On the one hand, the surroundings sensor can be aligned with a particular roadway feature of the roadway section. The particular roadway feature can be inferred here from the received status data. A type of focusing on essential regions of the roadway section therefore takes place. This is advantageous, for example, in the case of the surroundings sensor being a camera. The camera is configured e.g. to process in terms of technical imaging the focused particular roadway features and to make available the data, for example also in the form of an image, in the first motor vehicle. The image or plurality of images can then be displayed on a monitor and perceived by occupants of the first motor vehicle. This permits, for example, the driver of the motor vehicle to initiate an avoidance maneuver in order to avoid the roadway unevennesses, to slow down the first motor vehicle or else to prepare himself at least for passing through the roadway unevennesses and to assume, for example, a sitting position which is more protective for his body. Alternatively or additionally, the technical image data can, for example, also be processed by an evaluation unit of the first motor vehicle in order, if appropriate, to initiate automatically, for example in the case of an autonomously controlled first motor vehicle, any measures for passing through the roadway unevenness in a comfort-orientated fashion.

Alternatively or additionally, an evaluation of data of the surroundings sensor can also be adapted. This can mean e.g. that a region of the roadway section with a particular roadway feature which is accessible from the received status data is specifically evaluated. For example, it is possible merely to focus on and analyze the particular roadway feature, which speeds up the method owing to a smaller quantity of data to be evaluated and takes into account the essential aspects of the elevation of the driving comfort for the occupant of the first motor vehicle.

Also by way of example, the particular roadway feature can also be evaluated more precisely, e.g. using different sensors and/or evaluation algorithms. The evaluation of the roadway section is therefore carried out in a much more targeted and comfort-orientated fashion, since the essential aspects of the roadway section which can adversely affect the driving comfort, specifically the particular roadway features, are characterized more precisely, with the result that e.g. a driving maneuver which is carried out in response thereto can be made more efficient with respect to the driving comfort.

Also alternatively or additionally, updating of the status data can also be carried out in response to the sensing of the roadway section by the first motor vehicle. This is, in particular, advantageous if the status data which are currently being acquired by the first motor vehicle differ from the received status data. This can mean that e.g. particular roadway features on the roadway section have arisen or changed or else are no longer present. The updating of the status data of the roadway section is advantageous, in particular, for route planning with a focus on a comfortable route. It is also particularly advantageous for improving the driving comfort if the updated status data are transmitted, with the result that they can be received or retrieved e.g. for one or more further motor vehicles. Therefore, further motor vehicles, for example motor vehicles of a vehicle fleet, benefit from the updating of the status data. In this context it is also preferred if the updated status data are stored, in particular in such a way that further motor vehicles can access the stored status data because as a result a plurality of motor vehicles can also retrieve, at any desired time, the current status data which are relevant for the roadway section to be traveled on.

The method according to the invention makes it possible to improve easily the driving comfort of the first motor vehicle and, if appropriate, of one or more further motor vehicles. In addition it is also possible to produce a precise roadway map or to improve such a roadway map on the basis of the status data of roadway sections which are obtained by the method, in so far as particular roadway features are taken into account and, if appropriate, updated in said map, which is essential for comfort-oriented travel on the roadway sections of the roadway map. The method also significantly improves the quality, the reliability and the availability of status data of a roadway section, which can also be taken into account during the route planning. By, in particular, aligning the surroundings sensor of the first motor vehicle with a particular roadway feature of the roadway section which can be determined from the received status data it is possible to analyze the particular roadway feature in a more targeted fashion, since the particular roadway feature is already located in the focus of the surroundings sensor of the first motor vehicle. The method can be applied easily without a high level of technical complexity.

According to one advantageous development, the reception of the status data of the roadway section by the first motor vehicle takes place while the first motor vehicle is traveling. As a result, currently present status data can be taken into account directly while the first motor vehicle is traveling. The possibility of sensing particular roadway features which have arisen only recently, by means of the surroundings sensor of the first motor vehicle, is therefore significantly increased, as a result of which the driving comfort can also be increased. A change in or an elimination of particular roadway features also contributes to optimizing the comfort of the method since these current data can be taken into account by the first motor vehicle, e.g. during the route planning or when corresponding roadway sections are passed through.

The reception of the status data of the roadway section and of the geographic position of the roadway section is advantageously preceded by determination of the status data of the roadway section by a second motor vehicle by means of at least one surroundings sensor of the second motor vehicle, and/or determination of the geographic position of the roadway section. The status data which are necessary for the method can therefore be generated and made available in a very simple way and with reduced costs. The status data can be determined here solely by the second motor vehicle or else by a plurality of second motor vehicles which each have at least one surroundings sensor or are configured for the transference of geographic positions. As a result, a particularly high level of up-to-dateness of the status data can be achieved, in particular on roadway sections with a high level of traffic.

For this purpose, it is also advantageously provided that the status data which are determined by the second motor vehicle are stored and, in particular, stored in such a way that they are accessible to the second motor vehicle and/or to the first motor vehicle and/or to further motor vehicles. Therefore, e.g. before the roadway section is passed through, the first motor vehicle can retrieve and process further the current status data of the roadway section.

In an analogous fashion to this, there can also advantageously be provision that updated status data are stored by the first motor vehicle, specifically, in particular, in such a way that they are accessible to the second motor vehicle and/or to the first motor vehicle and/or to further motor vehicles. A roadway map which is produced on the basis of the status data which are made available in this way is distinguished by a particularly high level of up-to-dateness, with the result that particular roadway features can very easily be taken into account during route planning or by the driving behavior, which is also beneficial for the driving comfort. In addition, it is possible to access stored data at any desired time, with the result that there can be a reaction to any imminent particular roadway features not only during the current journey.

A further advantageous development provides that the determination of the status data by the second motor vehicle comprises analysis of the status data of the roadway section with respect to at least one particular roadway feature. The second motor vehicle therefore carries out a type of pre-analysis which also permits classification of particular roadway features, with the result that, for example in the case of a plurality of particular roadway features which are present in the roadway section, the first motor vehicle can focus merely on the essential particular roadway features. This can also be advantageous when selecting the surroundings sensor of the first motor vehicle. If the second motor vehicle detects, for example, a pothole by means of a camera and determines a depth of the pothole from the acquired data, the data relating to the depth of the pothole can be verified or analyzed more precisely e.g. by means of a ride level sensor of the first motor vehicle, which contributes to improving the estimation of particular roadway features in light of the driving comfort of the first motor vehicle.

The method also advantageously comprises a step of analyzing status data of the roadway section which is sensed by the surroundings sensor of the first motor vehicle. This is advantageous, in particular, when the status data of the roadway section are to be updated. An analysis can comprise here, in particular, determining particular roadway features, that is to say e.g. determining a depth of a bump in the ground, a width or a depth of a pothole or a spatial extent of an obstacle on the roadway section.

In order to increase the driving comfort further, adaptation of at least one chassis parameter and/or a driving behavior of the first motor vehicle as a function of the status data which are analyzed by the first motor vehicle is also advantageously provided. If, for example, in the roadway section which is to be traveled on, particular roadway features which adversely affect the comfort of the first motor vehicle are analyzed, it is possible to move away to a different roadway section e.g. by adapting the steering, or else a braking process can be carried out in order to slow down the first motor vehicle and therefore pass through the particular roadway feature with a reduced speed. It is also possible to adapt any chassis parameters, such as e.g. damping properties and therefore the oscillation behavior of the bodywork of the first motor vehicle, to the unevennesses to be expected, which are now analyzed in detail.

The adaptation of at least one chassis parameter and/or a driving behavior of the first motor vehicle takes place in response to a predefined threshold value for the status data which are acquired by the first motor vehicle being exceeded takes place particularly advantageously. This means in other words that e.g. threshold values are defined for certain status data items, for example for a frequency of bumps in the ground or a depth of potholes, and are stored e.g. in an evaluation unit. If status data which exceed the threshold values are then determined during the analysis of the status data of a roadway section by the first motor vehicle, it is possible to react thereto by adapting one or more chassis parameters and/or by adapting the driving behavior of the motor vehicle. In the case of an autonomously controlled first motor vehicle it is possible to perform the adaptation of the chassis parameters and/or the adaptation of the driving behavior in a preferably automatic fashion. In any case, the roadway section is then passed through with increased driving comfort.

The surroundings sensors which are used according to the method are advantageously selected from acceleration sensors, distance sensors, roadway distance sensors, ride height sensors, rolling sensors, roadway unevenness sensors such as, in particular, cameras and LIDAR, sensors for sensing the motor vehicle's own movements, ultrasonic sensors and combinations thereof. The surroundings sensors which are specified above are usually present in modern motor vehicles, and therefore there is essentially no need for an additional sensor system to carry out the method, which permits costs to be saved. In addition, these surroundings sensors are particularly suitable for analyzing particular roadway features and, in particular, for detecting and determining particular roadway features and contributing corresponding data for the analysis thereof.

Particularly suitable status data in the application of the method are a lane and/or a travel direction and/or a frequency of roadway unevennesses and/or an amplitude of roadway unevennesses and/or a data item at which the roadway section was passed through. The status data are particularly important for the driving comfort and the determination of any particular roadway features which adversely affect the driving comfort.

According to a further aspect of the present invention, a driver assistance system for controlling a first motor vehicle is described. The driver assistance system comprises a data input, an evaluation unit and a data output. In this context, the data input is configured for the reception of status data of a roadway section and a geographic position of the roadway section by the first motor vehicle. The data can be received in an acoustic, visual or electronic form, wherein the electronic form is preferred because the status data and the geographic position can therefore be further processed directly, if necessary.

The evaluation unit which is provided is configured to sense, as a function of the received status data, the roadway section by means of a surroundings sensor of the first motor vehicle. It goes without saying here that the roadway section can also be sensed by two or more surroundings sensors of the first motor vehicle. The type and number of the surroundings sensors which are used for this is dependent on the conditions of the surroundings of the roadway section and on any particular roadway features to be determined. The evaluation unit therefore transmits signals to a surroundings sensor or to a plurality of surroundings sensors, and the surroundings sensor or the surroundings sensors then senses/sense the roadway section which is directly related to the received status data and the geographic position of the roadway section, with the result that the surroundings sensor or the surroundings sensors can, if appropriate, perform further analysis of the roadway section with respect to the status data, in particular of any particular roadway features.

In response to the sensing of the received status data of the roadway section by the surroundings sensor of the first motor vehicle, the data output is configured to align the surroundings sensor with a particular roadway feature and/or to adapt an evaluation of the surroundings sensor and/or to update the status data and to transmit the updated status data.

The status data which are received by the data input and the geographic position of the roadway section therefore permit a certain pre-selection with respect to any particular roadway features which are present on the roadway section and which can then subsequently be focused on by the surroundings sensor of the first motor vehicle by aligning the surroundings sensor with the particular roadway feature, as a result of which it is also possible to pay special attention to any particular roadway features which are determined, which is advantageous with respect to increasing the driving comfort of the first motor vehicle. Particular roadway features can therefore be sensed more quickly and also in more detail by the surroundings sensor of the first motor vehicle. The alignment of the surroundings sensor in response to the sensing of the roadway section by the surroundings sensor of the first motor vehicle is carried out by the data output which is configured for this purpose.

The data output can alternatively or additionally also be configured to adapt the evaluation of the surroundings sensor, that is to say e.g. to direct the surroundings sensor exclusively toward any particular roadway features which are present and/or to make the analysis of particular roadway features more precise or to adapt it by means of further or other surroundings sensors.

Alternatively or additionally to this, there can also be subsequent updating and transmission of the status data, for which purpose the data output is configured. This can serve to take into account routes with a high driving comfort and therefore as far as possible without particular roadway features for future route planning. A roadway map can also be produced or added to on the basis of the updated and transmitted status data relating to a roadway section, and said roadway map can be used as the basis for comfort-optimized route planning.

The driver assistance system is distinguished by an uncomplicated design and permits comfortable locomotion with the first motor vehicle.

With respect to the concepts and the functions for which the data input, the evaluation unit and the data output are configured, reference is made, or is additionally made, to the statements relating to the method according to the invention for controlling the first motor vehicle. Likewise, it is to be noted that the method according to the invention is suitable to be carried out by the driver assistance system described above. In this context, a driver assistance system which is configured to carry out the method described above is also disclosed as a further aspect according to the invention. Therefore the advantages, advantageous developments and advantageous effects of the method according to the invention and of the driver assistance system according to the invention are also reciprocally applied.

One advantageous embodiment is characterized in that the evaluation unit is also configured to analyze status data of the roadway section which is sensed by the surroundings sensor of the first motor vehicle, wherein the data output is also configured to adapt at least one chassis parameter and/or a driving behavior of the first motor vehicle as a function of the analyzed status data. As a result, the driving comfort can be increased, for example when the first motor vehicle passes the sensed roadway section which has been analyzed with respect to particular roadway features.

According to a further aspect according to the invention, a motor vehicle is described which comprises a driver assistance system as described above. The motor vehicle is as a result distinguished by a high level of driving comfort.

Other objects, advantages and novel features of the present invention will become apparent from the following detailed description of one or more preferred embodiments when considered in conjunction with the accompanying drawings.

DETAILED DESCRIPTION OF THE DRAWINGS

The present invention will be explained in more detail on the basis of exemplary embodiments. Only the details which are essential to the invention are illustrated in the figures. All the other details are omitted for the sake of clarity. The same reference symbols stand for the same components/elements here.

Figure 1:
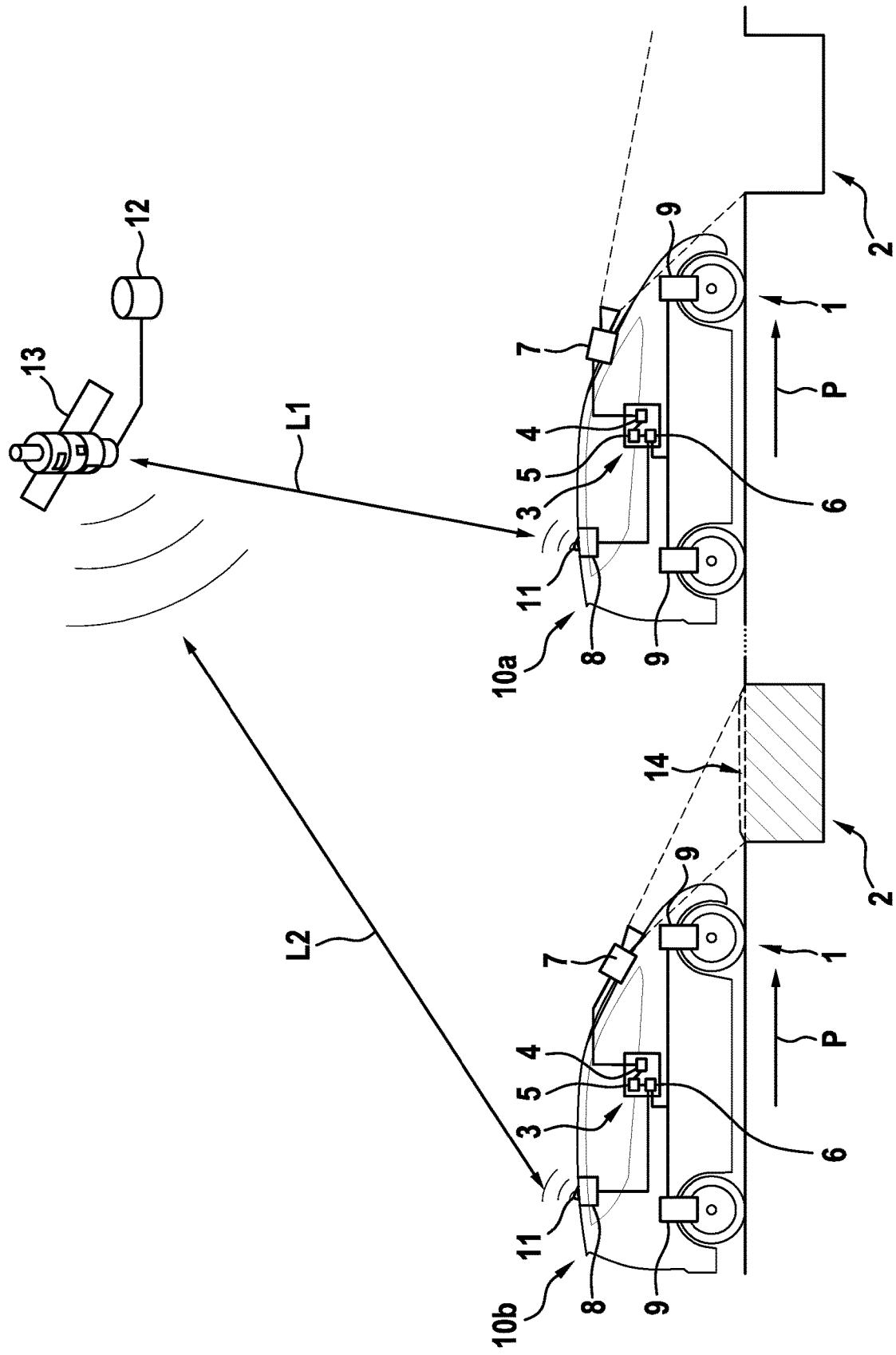
FIG. 1 is a schematic view illustrating the driver assistance system and the motor vehicle according to one embodiment of the invention.

FIG. 1 shows in detail two situations which are chronologically separate from one another. In the right-hand half of the figure a second vehicle 10a is illustrated. The second vehicle 10a is moving in the direction of the arrow P on a roadway section 1. The roadway section 1 has a particular roadway feature 2, specifically a pothole, toward which the second motor vehicle 10a is moving.

The second motor vehicle 10a has a driver assistance system 3 which comprises a data input 4, an evaluation unit 5 and a data output 6.

The data input 4 is connected to a surroundings sensor 7 which is embodied in the form of a camera. The camera is configured to capture by use of imaging technology a route section of the roadway section 1 which lies ahead of the second motor vehicle 10a, and to determine status data of the roadway section 1 on the basis thereof. The second motor vehicle 10a is also able to determine the geographic position of the roadway section 1, for example by way of a GPS device 8 which can both receive data, such as e.g. location data or other geographic data, from a satellite 13 via the wireless communication link L1, and transmit data via the same wireless communication link L1 to the satellite 13 via the antenna 11. The data which are transmitted to the satellite 13 or received from the satellite 13 can be stored in a data memory 12.

Some of the status data items which are determined by the second motor vehicle 10a include, for example, a lane, a travel direction, a frequency of roadway unevennesses 2, an amplitude of roadway unevennesses 2, and/or a data item relating to the roadway section 1 which has been passed through. These status data are advantageous for characterizing the particular roadway feature of the roadway section 1, which is in turn important for determining (and therefore also for increasing) the driving comfort when traveling through the roadway section 1 with a first motor vehicle 10b.

At a time which occurs after the second motor vehicle 10a has passed through the roadway section 1, the first motor vehicle 10b (left-hand half of the figure) arrives at the same roadway section 1, e.g. given identical route planning of the route of the second motor vehicle 10a and of the first motor vehicle 10b.

The first motor vehicle 10b is constructed in an analogous fashion to the second motor vehicle 10a and also includes a driver assistance system 3 with a data input 4, evaluation unit 5 and data output 6, a surroundings sensor 7, which is embodied in turn in the form of a camera, a GPS device 8, an antenna 11 for outputting data to the satellite 13 and a semi-active or active chassis damping or spring system 9, which is also connected by data technology to the data output 6.

The data input 4 of the first motor vehicle 10b is configured to receive status data of the roadway section 1 and the data which are associated with the roadway section 1 and relate it to its geographic position. This can take place, e.g. as illustrated in FIG. 1, by the reception of satellite data via the wireless communication link L2. For this purpose, corresponding status data and/or data relating to the geographic position of the roadway section 1 can be read out of the data memory 12 and received by the first motor vehicle 10b via the satellite 13 by way of the antenna 11, and, e.g. by the data input 4 here.

The evaluation unit 5 is configured to sense the roadway section 1 by use of the surroundings sensor 7, that is to say the camera of the first motor vehicle 10b, and, if appropriate, to analyze it, as a function of the received status data.

The data output 6 is configured, in response to the sensing of the roadway section 1 by the surroundings sensor 7 of the first motor vehicle 10b, to align the surroundings sensor 7 with the particular roadway feature 2 which is located in front of the first motor vehicle 10b in FIG. 1. This can be recognized by the fact that the capturing range of the camera which is indicated by dashed lines is focused on the region of the roadway section 1 in which the status data which are determined by the second motor vehicle 10a permit the particular roadway feature 2 to be detected. This region of the roadway can be unambiguously identified by means of its geographic position.

The data output 6 is configured, in response to the sensing of the roadway section 1 by the surroundings sensor 7 of the first motor vehicle 10b, to adapt an evaluation of the surroundings sensor 7. This can be done, for example, by way of a detailed analysis of the dimensions of the particular roadway feature 2, or else e.g. also by using different surroundings sensors in order e.g. to generate different or more precise status data. This is advantageous, in particular, in the situation illustrated in FIG. 1. As is indicated by the dashed lines on the particular roadway feature 2, the particular roadway feature 2, that is to say the pothole, has been filled in and covered with an asphalt layer 14. The particular roadway feature 2 therefore no longer exists. This consequently results in changed status data for the geographic position of the roadway section 1. These status data can be determined by use of the surroundings sensor 7 or else by use of further surroundings sensors (not shown).

The data output 6 can also be configured in this context to update the status data determined by the first motor vehicle 10b and to transmit the updated status data to the satellite 13. This updated status data are then available for retrieval by further motor vehicles or else by the second motor vehicle 10a and/or by the first motor vehicle 10b at a later point in time, which makes it possible to determine a comfort-optimized route.

In the current present case here, the data output 6 is also configured to adapt at least one chassis parameter and/or a driving behavior of the first motor vehicle 10b as a function of the status data analyzed by the first motor vehicle 10b. This is advantageous, in particular, if the status data relating to the roadway section 1 which have been determined by the first motor vehicle 10b permit passage through a particular roadway feature 2 to be expected, in particular if the determined status data exceed a threshold value which would indicate a significant reduction in the driving comfort when the roadway unevenness 2 is passed through. Since in the present case in FIG. 1 the particular roadway feature 2 has been covered by an asphalt layer 14, it is not necessary to adapt a chassis parameter and/or driving behavior of the first motor vehicle 10b, but adaptation could be carried out e.g. by activating the semi-active or active chassis damping or spring system 9.

Figure 2:
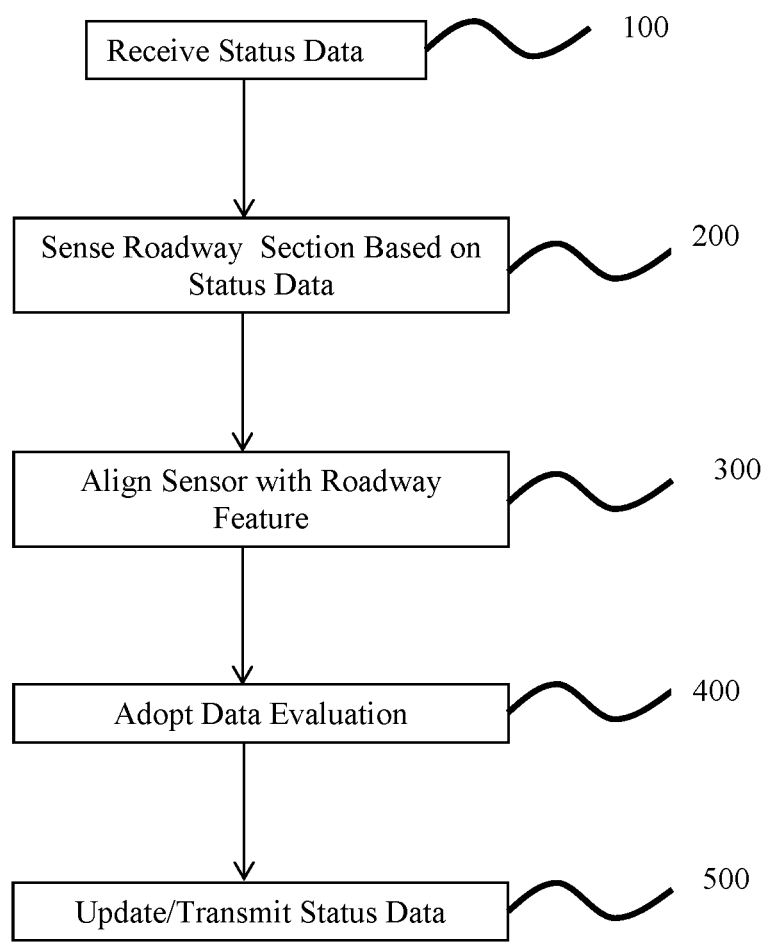
FIG. 2 is a flowchart illustrating method steps of a method for controlling a motor vehicle according to a further embodiment of the invention.

FIG. 2 is a flowchart illustrating method steps for controlling a motor vehicle, in particular for improving a driving comfort of a motor vehicle. The method steps can be carried out e.g. by the driver assistance system 3 from FIG. 1. Reference is therefore made additionally to the statements relating to FIG. 1.

In method step 100, status data of a roadway section 1 and of a geographic position of the roadway section 1 are received by the first motor vehicle 10b. These status data relate, in particular, to any particular roadway features on the roadway section 1 which permit a decrease in the driving comfort when the first motor vehicle 10b drives through the roadway section 1 to be expected.

In method step 200, sensing of the roadway section 1 by a surroundings sensor 7 of the first motor vehicle 10b takes place as a function of the received status data, and in response thereto in method step 300 the surroundings sensor 7 is aligned with a particular roadway feature 2 of the roadway section 1, which corresponds to focusing of the camera of the first motor vehicle 10b on the particular roadway feature 2. This is possible, in particular, by virtue of the fact that corresponding status data relating to the particular roadway feature 2 have already been received by the first motor vehicle 10b. In addition, in method step 400 adaptation of an evaluation of data of the surroundings sensor 7 of the first motor vehicle 10b takes place, for example by means of more precise analysis of the status data relating to the particular roadway feature 2. Additionally or alternatively, the status data which are obtained by the first motor vehicle can be updated in a method step 500 and transmitted e.g. to a satellite 13 and/or stored in a data memory 12.

By virtue of the more specific analysis of the status data which have been initially received by the first motor vehicle 10b, the status of a roadway section 1 can be analyzed in a precisely targeted fashion and corresponding status data can be updated in this respect. For example a very accurately detailed and current roadway map can be produced on this basis, and the different motor vehicles can access said map and orient their comfort-oriented route planning according to said map. The method significantly improves the quality, the reliability and the availability of status data of a roadway section.

LIST OF REFERENCE SYMBOLS

1 Roadway section
2 Particular roadway feature
3 Driver assistance system
4 Data input
5 Evaluation unit
6 Data output
7 Surroundings sensor
8 GPS device
9 Semi-active or active chassis damping or spring system
10a Second motor vehicle
10b First motor vehicle
11 Antenna
12 Data memory
13 Satellite
14 Asphalt layer
L1, L2 Wireless communication links
P Direction of movement
100-500 Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a motor vehicle, the method comprising the steps of:
    receiving status data of a roadway section and a geographic position of the roadway section by the motor vehicle,
    sensing, as a function of the status data, the roadway section by a surroundings sensor of the motor vehicle, and in response:
        aligning the surroundings sensor with a particular roadway feature of the roadway section, and
        adapting a chassis parameter and/or a driving behavior of the motor vehicle in response to exceeding a predefined threshold for the status data.

2. The method as claimed in claim 1, wherein
    the receiving of the status data of the roadway section takes place while the motor vehicle is traveling.

3. The method as claimed in claim 1, wherein
    the motor vehicle is a first motor vehicle, and
the receiving of the status data of the roadway section and of the geographic position of the roadway section is preceded by:
determining the status data of the roadway section by a second motor vehicle via at least one surroundings sensor of the second motor vehicle, and/or
determining the geographic position of the roadway section.

4. The method as claimed in claim 3, wherein
    the determining of the status data by the second motor vehicle comprises analysis of the status data of the roadway section with respect to at least one particular roadway feature.

5. The method as claimed in claim 1, further comprising the step of:
    analyzing the status data of the roadway section which is sensed by the surroundings sensor of the motor vehicle.

6. The method as claimed in claim 1, further comprising the step of:
    updating the status data and transmitting the updated status data.

7. The method as claimed in claim 1, wherein adapting an evaluation of data of the surroundings sensor.

8. The method as claimed in claim 1, wherein the surroundings sensor comprises one or more of:
    acceleration sensors, distance sensors, roadway distance sensors, ride height sensors, rolling sensors, roadway unevenness sensors including cameras and LIDAR, sensors for sensing the motor vehicle's own movements, and ultrasonic sensors.

9. The method as claimed in claim 1, wherein
    the status data comprises a lane, a travel direction, a frequency of roadway unevennesses, an amplitude of roadway unevennesses, and/or a data item at which the roadway section was passed through.

10. A driver assistance system for controlling a motor vehicle, comprising:
    a surroundings sensor of the motor vehicle; a data input;
    an evaluation unit; and a data output, wherein
    the data input is configured for receiving status data of a roadway section and a geographic position of the roadway section by the motor vehicle,
    the evaluation unit is configured to:
    sense, as a function of the status data, the roadway section via the surroundings sensor, and
    the data output is configured, in response, to:
    align the surroundings sensor with a particular roadway feature, and
    adapt a chassis parameter and/or a driving behavior of the motor vehicle in response to exceeding a predefined threshold for the status data.

11. The driver assistance system as claimed in claim 10, wherein
    the evaluation unit is further configured to analyze status data of the roadway section, and
    the data output is further configured to:
    adapt an evaluation of the surroundings sensor, or
    update the status data and transmit the updated status data.

12. A system, comprising:
    a driver assistance system that controls a motor vehicle; a surroundings sensor of the motor vehicle, wherein
    a driver assistance system is operatively configured to execute processing to:
    receive status data of a roadway section and a geographic position of the roadway section by the motor vehicle,
    sense, as a function of the status data, the roadway section by the surroundings
    sensor, and in response thereto:
    align the surroundings sensor with a particular roadway feature of the roadway section, and
    adapt a chassis parameter and/or a driving behavior of the motor vehicle in response to exceeding a predefined threshold for the status data.

13. A motor vehicle comprising a driver assistance system as claimed in claim 10.

14. The method as claimed in claim 1, further comprising:
    analyzing one or more dimensions of the particular roadway feature.

15. The method as claimed in claim 5, wherein
    the status data is a first status data,
    the particular roadway feature is a first particular roadway feature, and the method further comprises the step of:
    not adapting at least one chassis parameter and/or a driving behavior of the motor vehicle as a function of a second status data;
    updating the second status data to reflect that a second particular roadway feature of the roadway section does not exist; and
    transmitting the updated second status data.

16. The method as claimed in claim 1, further comprising:
    pre-selecting the particular roadway feature from a plurality of roadway features indicated by the status data to be present in the roadway section.

17. The method as claimed in claim 1, wherein
    the surroundings sensor is a first surroundings sensor, and the method further comprises:
    sensing the particular roadway feature using a second surroundings sensor to generate data about the particular roadway feature that differs from data generated by the first surroundings sensor.

* * * * *